(12) United States Patent  (10) Patent No.: US 7,950,814 B2
Chang et al.  (45) Date of Patent: May 31, 2011

(54) BACKLIGHT MODULE AND METHOD OF MANUFACTURE USING COMPLEMENTARY LIGHT SOURCES HAVING THE SAME COLOR

(75) Inventors: Ya-Hsien Chang, Hsin-Chu (TW); Yu-Kai Lin, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 380 days.

(21) Appl. No.: 12/268,494

(22) Filed: Nov. 11, 2008

(65) Prior Publication Data

US 2009/0147501 A1 Jun. 11, 2009

(30) Foreign Application Priority Data

Dec. 6, 2007 (TW) ................................ 96146625 A (51) Int. Cl.
*G02F 1/13357* (2006.01)
(52) U.S. Cl. ...................................... 362/97.3; 362/97.2
(58) Field of Classification Search .................. 362/97.1, 362/97.2, 97.3, 231
See application file for complete search history.

(56) References Cited

U.S. PATENT DOCUMENTS

| 7,061,454 | B2 | 6/2006 | Sasuga et al. |
| 2004/0233348 | A1 | 11/2004 | Mai |
| 2006/0114201 | A1 | 6/2006 | Chang |
| 2007/0274093 | A1 * | 11/2007 | Haim et al. ................. 362/561 |

FOREIGN PATENT DOCUMENTS

JP 2006133708 A * 5/2006

OTHER PUBLICATIONS

English language translation of abstract of M283328 (TW).
English language translation of abstract of TW 200801707.

* cited by examiner

*Primary Examiner* — David V Bruce
(74) *Attorney, Agent, or Firm* — Thomas, Kayden, Horstemeyer & Risley, LLP (57) ABSTRACT

A backlight module includes an optical film set and a plurality of light source sets having a first light source and a second light source. The first light source generates a first chromaticity light while the second light source generates a second chromaticity light. The first chromaticity light mixes with the second chromaticity light in the space between the light source sets and the optical film set and then enters the optical film set. The first chromaticity light and the second chromaticity light have their own spectrum and both spectra fall into a first color region of the CIE 1931 color space. Within the first color region, the spectrum of the first chromaticity light is close to a second color region while the spectrum of the second chromaticity light is close to a third color region.

27 Claims, 12 Drawing Sheets

BACKLIGHT MODULE AND METHOD OF MANUFACTURE USING COMPLEMENTARY LIGHT SOURCES HAVING THE SAME COLOR

BACKGROUND OF THE INVENTION

1. Field of the Invention

The present invention relates to a backlight module and the manufacture method thereof. Substantially, the present invention relates to a backlight module which uses complementary light sources and the manufacture method thereof.

2. Description of the Prior Art

The display panels and the panel display devices using the display panels are gradually becoming the mainstream in the display devices. For instance, various display screens, home flat screen televisions, flat screen monitors of personal computer and laptop computer, display screens of cellular phone and display camera are products which use display panels as one of the essential components. Especially over these years the market demand for LCD (Liquid Crystal Display) device greatly increases. Thus the design of backlight module used in the LCD device is diversified in order to match up the capacity and appearance requirements on the LCD devices.

Figure 1A:
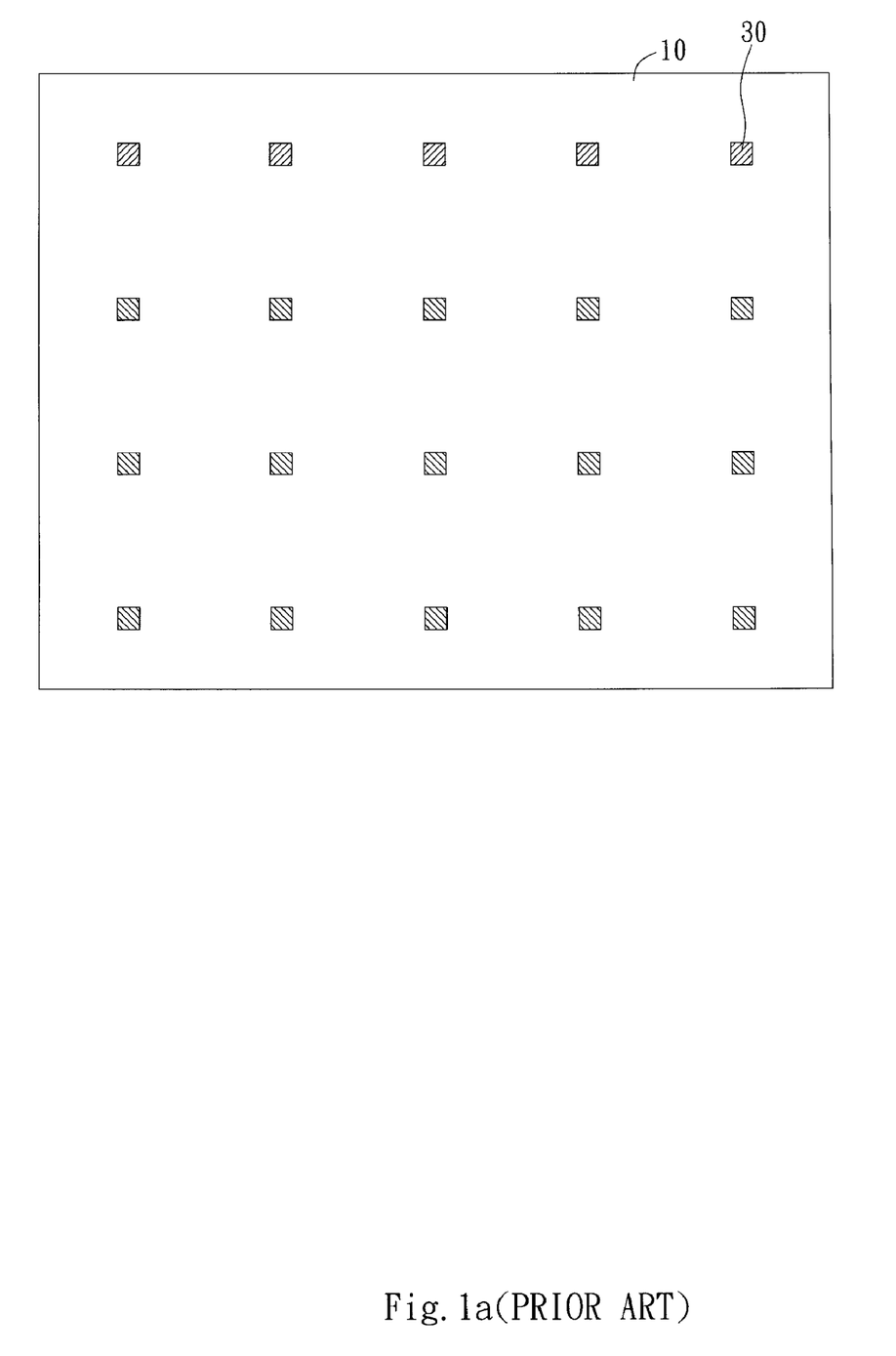
FIG. 1a illustrates a conventional bottom-lighting backlight module using LEDs (Light Emitted Diodes)
Figure 1B:
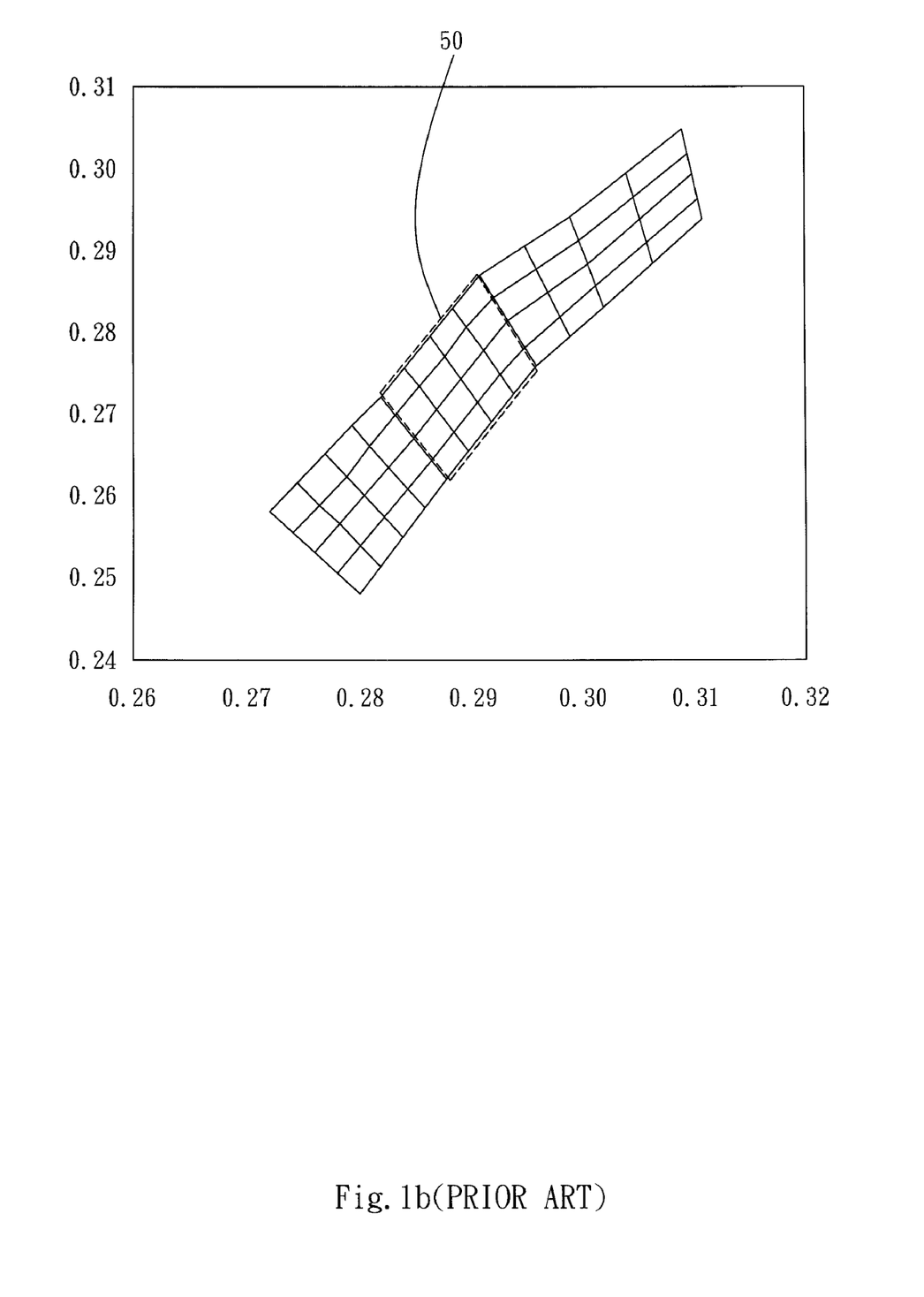
FIG. 1b illustrates a chromaticity distribution of a conventional backlight module using white LEDs.

Take the bottom-lighting backlight module for instance; the LED units (Light Emitting Diode) are intensively used as light sources. As FIG. 1a shows, a plurality of LED units 30 is disposed on the base plate 10 as the backlight source. The LED units 30 are evenly distributed on base plate 500 10 and radiate light which moves away from the base plate 10. Normally, white LEDs are used as the backlight source. However, due to the limitation on the ability to control phosphor coating process, the white LEDs product may have uneven colors or radiate light with uneven luminance and color. As FIG. 1b shows, the spectrum generated by white LEDs produced by the same coating process is distributed in band shape. One side of the band-shaped spectrum is close to yellow light region while the opposite side is close to blue light region. In order to fulfill the requirement of even chromaticity, conventionally white LEDs with the same chromaticity, such as the white LEDs whose spectrum falls into region 50, will be chosen. However, white LEDs with spectrum outside of region 50 may be dropped and thus increase the overall cost of production.

SUMMARY OF THE INVENTION

It is an objective of the present invention to provide a backlight module and the manufacture method thereof to reduce the cost of production.

It is an objective of the present invention to provide a backlight module and the manufacture method thereof to increase the range of usable chromaticity of the light sources.

The backlight module of the present invention includes an optical film set and a plurality of light source sets. The optical film set has a light incident plane and a light exit plane. The light source sets are disposed corresponding to the light incident surface. Each of the light source sets has at least one first light source and at least one second light source, the first light source generates a first chromaticity light and the second light source generates a second light. The first chromaticity light and the second chromaticity light mix in the space between the light source sets and the optical film group to form a harmonious light. The harmonious light then enters the light incident plane of the optical film set.

The first chromaticity light and the second chromaticity light respectively have a spectrum and both light spectra belong to a first color region. In this first color region, the spectrum of first chromaticity light is distributed close to a second color region and the spectrum of second chromaticity light is distributed close to a third color region. The first chromaticity light and the second chromaticity light have the same color which belongs to the first color region, but respectively have two different chromaticities. Thus the first chromaticity light and the second chromaticity light are distributed differently in the same color region. The spectrum of the first chromaticity light is closer to the second color region than the spectrum of the second light.

The manufacture method of the backlight module of the present invention includes firstly forming a plurality of light source sets and each of the light source sets includes at least one first light source and at least one second light source 320 and secondly disposing the plurality of light source sets correspondingly to the light incident plane of the optical film set and thus the first chromaticity light and the second chromaticity light mix and then enter the light incident plane of the optical film set. Furthermore, the manufacture method can further include manufacturing a plurality of white LEDs in one process, selecting part of the white LEDs to be the first light sources and selecting part of the white LEDs to be the second light sources.

DETAILED DESCRIPTION OF THE PREFERRED EMBODIMENT

The present invention provides a backlight module and the manufacture method thereof. In preferable embodiments, the backlight modules are provided to be used in the LCD (Liquid Crystal Display) devices. However, in different embodiments, the backlights can also be provided to be used in devices or appliances which require planar light source such as computer keyboards, mobile phone keypads, billboards etc. In preferable embodiments, the LCD devices include color LCD devices. However, in different embodiments, the LCD devices can also include single color LCD devices. Furthermore, LCD devices generally refer to display devices using LCD panels which include LCD television, LCD monitors used in personal computers and in laptop computers, LCD screens used in mobile phones and in digital cameras etc.

Figure 2:
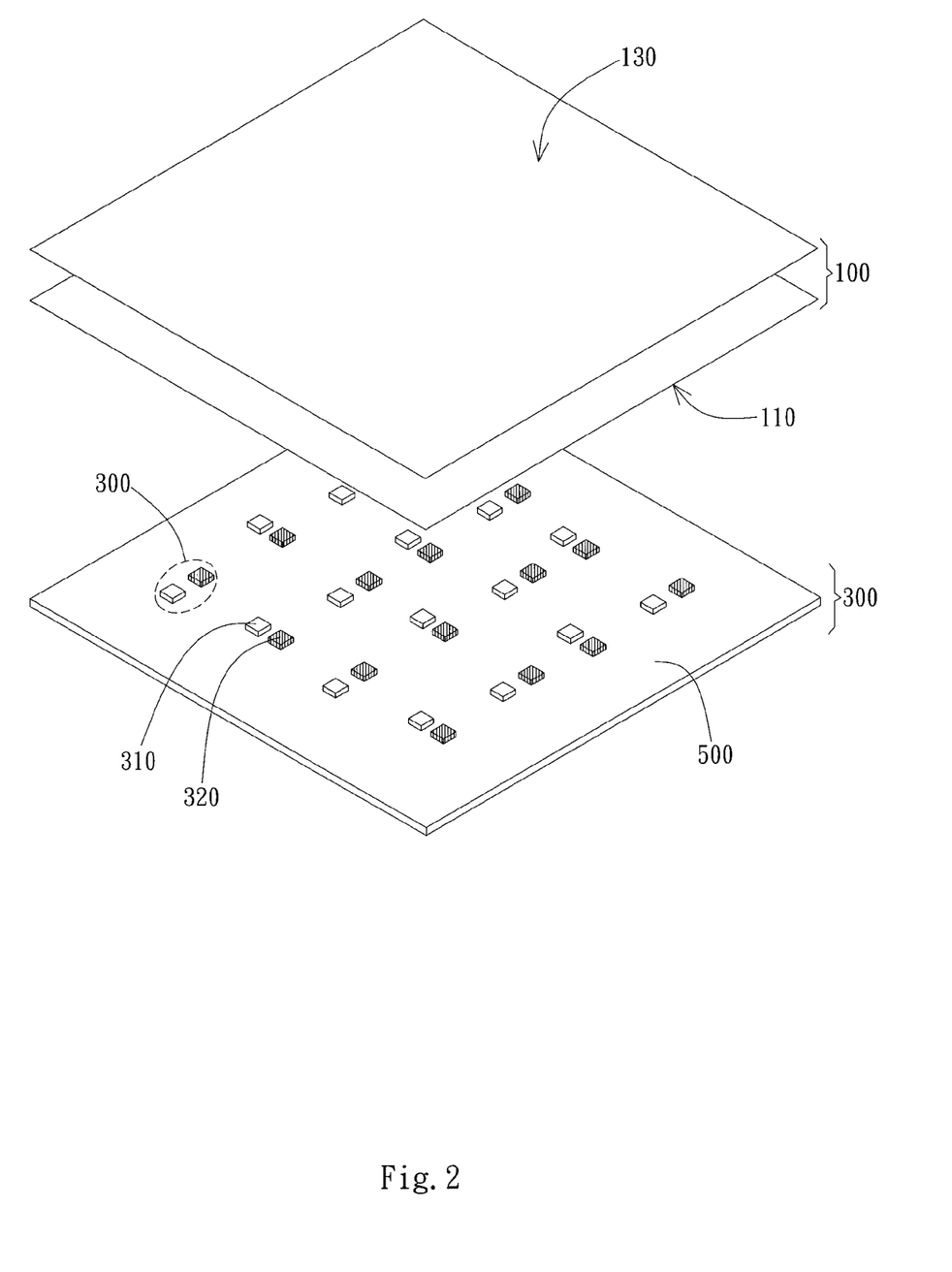
FIG. 2 illustrates a perspective view of one embodiment of the backlight module according to the present invention.

As FIG. 2 shows, the backlight module of the present invention includes an optical film set 100 and a plurality of light source sets 300. The optical film set 100 includes one or a plurality of disk-like/plank-shaped optical elements such as light guide plates, polarizer films, brightness enhancing films etc. As for the bottom-lighting backlight module illustrated in FIG. 2, the light incident plane 110 and the light exit plane 130 are respectively located on the top surface and the bottom surface of optical film set 100. However, in different embodiments such as edge-lighting backlight module, the light incident plane 110 can be formed on the lateral side of the optical film set 100 which guide the light evenly to the light exit plane 130 formed on the top surface of optical film set 100.

The light source sets 300 are disposed correspondingly to the light incident plane 110 of the optical film set 100. For instance, in the embodiment of a bottom lighting backlight module illustrated in FIG. 2, the light source set 300 is disposed beneath the optical film set 100 in order to correspond to the light incident plane 110 at the bottom surface of the optical film set 100. However, in an embodiment of the present invention in the edge lighting backlight module, the light source set 300 can be disposed on the lateral side of the optical film set 100. In the present embodiment, the backlight module further includes a base plate 500. The base plate 500 is disposed in parallel with the optical film set 100 and beneath the optical film set 100. The light source sets 300 are disposed on the base plate 500 and emit light towards the optical film set 100 to form a bottom lighting backlight module.

Every light source set 300 has at least one first light source 310 and at least one second light source 320. In the present more preferable embodiment, the first light source 310 and the second light source 320 include respectively LEDs. However, in different embodiments, the first light source 310 and the second light source 320 can also include light emitting chips or other light sources. The first light source 310 generates a first chromaticity light and the second light source 320 generates a second chromaticity light. The first chromaticity light and the second chromaticity light mix in the space between the light source set 300 and the optical film set 100 to form a harmonious light. The harmonious light then enters the light incident plane 110 of the optical film set 100.

The first chromaticity light and the second chromaticity light respectively have their own chromaticity, and the two chromaticities both belong to a first color region. In the first color region, the spectrum distribution of the first chromaticity light is close to a second color region while the spectrum distribution of the second chromaticity light is close to third color region. In other words, the first color region, the second color region and the third color region are color regions formed by lights of different color models, wherein the three color regions have different coverages in the color space. For instance, white light, yellow light and blue light have different coverages in the color space. The first chromaticity light and the second chromaticity light are lights with the same color which belongs to the first color region, but the two lights have different chromaticities. Thus the first chromaticity light and the second chromaticity light have different spectrum distributions in the same color region and the spectrum distribution of the first chromaticity light is closer to the second color region than the spectrum distribution of the second chromaticity light.

Figure 3:
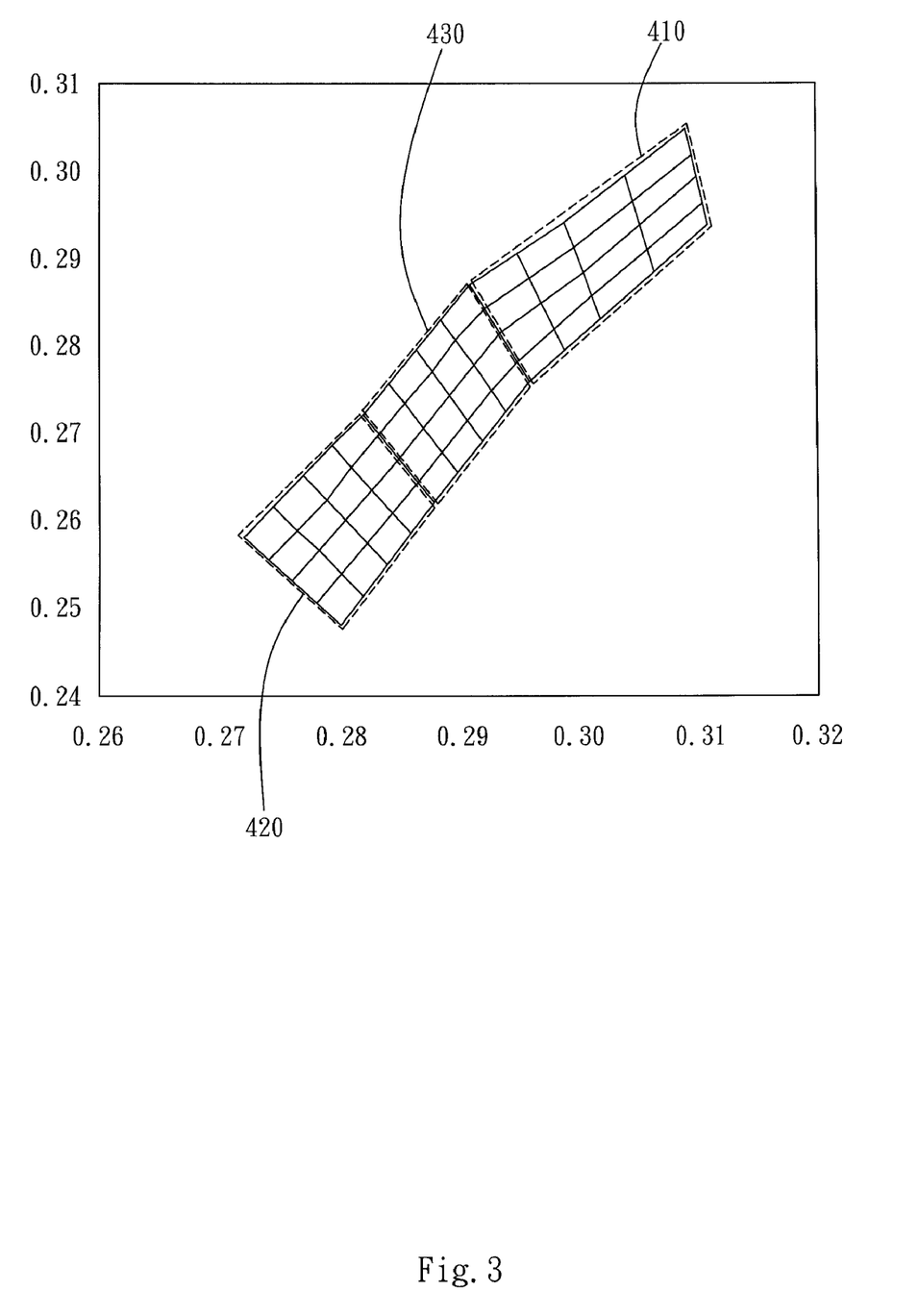
FIG. 3 illustrates the spectrum distribution in the CIE 1931 color space of the first light source 310 and the second light source 320 in one embodiment of the present invention.

In the embodiment illustrated in FIG. 3, the first color region is a white light region; thus the first chromaticity light and the second chromaticity light are both white light. Referring to the CIE 1931 color space, the white light region formed by the first color region is preferred to be situated in an area enclosed by (0.23, 0.21), (0.32, 0.31), (0.32, 0.21), and (0.23, 0.31) in the CIE1931 color space; the above-mentioned area is preferably a quadrilateral but is not limited thereto. In other words, the first chromaticity light spectrum distribution 410 and the second chromaticity light spectrum distribution 420 are situated in an area enclosed by the above-mentioned coordinates. In the present embodiment, the coordinates in the CIE 1931 color space are mainly used to describe the scopes of various color regions or of various light spectra. However, in different embodiments, other color space models or units corresponding to the coordinates in CIE 1931 color space can also be used to describe the scopes of various color regions or various light spectra.

In the present embodiment, the second color region preferably includes a yellow light region and the third color region preferably includes a blue light region. In the CIE 1931 color space, the distribution of the yellow light region is situated on the top right side of the white light region and the blue light region is situated on the bottom left side of the white light region. Thus the first chromaticity light spectrum distribution 410 is closer to the top right side of the first color region than the second chromaticity light spectrum distribution 420.

In the embodiment illustrated in FIG. 3, the first color region includes an area covered by a target spectrum distribution 430. The light formed by mixing the first chromaticity light with the second chromaticity light also has a spectrum, wherein the above-mentioned spectrum falls into the coverage of the target spectrum distribution 430. As FIG. 3 shows, the target spectrum distribution 430 is closer to the center of the first color region. The first chromaticity light spectrum distribution 410 is situated on the top right side of the target spectrum distribution 430 and is closer to the yellow light region. The second chromaticity light spectrum distribution 420 is situated on the bottom left side of the target spectrum distribution 430 and is closer to the blue light region. Furthermore, referring to the CIE 1931 color space, the target spectrum distribution 430 is preferred to be situated in an area enclosed by (0.225, 0.205), (0.315, 0.305), (0.225, 0.305) and (0.315, 0.205). However, in different embodiments, the target spectrum distribution 430 can be further limited to be within the area enclosed by (0.288, 0.263), (0.296, 0.276), (0.291, 0.288) and (0.283, 0.272) in order to obtain more even chromaticity uniformity. Furthermore the above-mentioned areas preferably include a quadrilateral but are not limited thereto.

In the embodiment illustrated in FIG. 3, the coordinate difference between the target spectrum distribution 430 and the first chromaticity light spectrum distribution 410 in the CIE 1931 color space is between (0.036, 0.056) and (−0.036, −0.056). In more preferred embodiments, the above-mentioned coordinate difference can be reduced to be between (0.018, 0.028) and (−0.018, −0.028) or can be further reduced to be between (0.01, 0.014) and (−0.01, −0.014) in order to facilitate the mixing of lights. The above-mentioned coordinate difference preferably refers to the distance from the center of the target spectrum distribution 430 to the center of the first chromaticity light spectrum distribution 410. However, in different embodiments, this coordinate difference can include the distance between the respective edges of the first chromaticity light spectrum distribution 410 and the target spectrum distribution 430 corresponding to each other. Similarly, the coordinate difference between the target spectrum distribution 430 and the second chromaticity light spectrum distribution 420 in the CIE 1931 color space can also be between (0.036, 0.056) and (−0.036, −0.056). In more preferred embodiments, the above-mentioned coordinate difference can be reduced to be between (0.018, 0.028) and (−0.018, −0.028) or can be further reduced to be between (0.01, 0.014) and (−0.01, −0.014) in order to obtain improved mixing between lights.

As FIG. 3 shows, the first chromaticity light spectrum distribution 410, target spectrum distribution 430 and second chromaticity light spectrum distribution 420 both have continuity. In other words, the first chromaticity light spectrum distribution 410, target spectrum distribution 430 and second chromaticity light spectrum distribution 420 are different sections of a stripe-shaped spectrum distribution. In more preferred embodiment, when the first light source 310, second light source 320 and target chromaticity light source having target spectrum distribution 430 are manufactured in the same batch, deviation in manufacture precision can cause the above-mentioned light sources to have an overall stripe-shaped spectrum distribution. Furthermore, if the first light source 310 and the second light sources 320 are both LEDs made of the same phosphor powder and in the same ratio but having different phosphor powder densities, the first chromaticity light spectrum distribution 410 and the second chromaticity light spectrum distribution 420 may deviate from the target spectrum distribution 430. At this time, the first light source 310 and the second light source 320 with deviating spectrum may mix to generate a light which has the target spectrum distribution 430.

Figure 4:
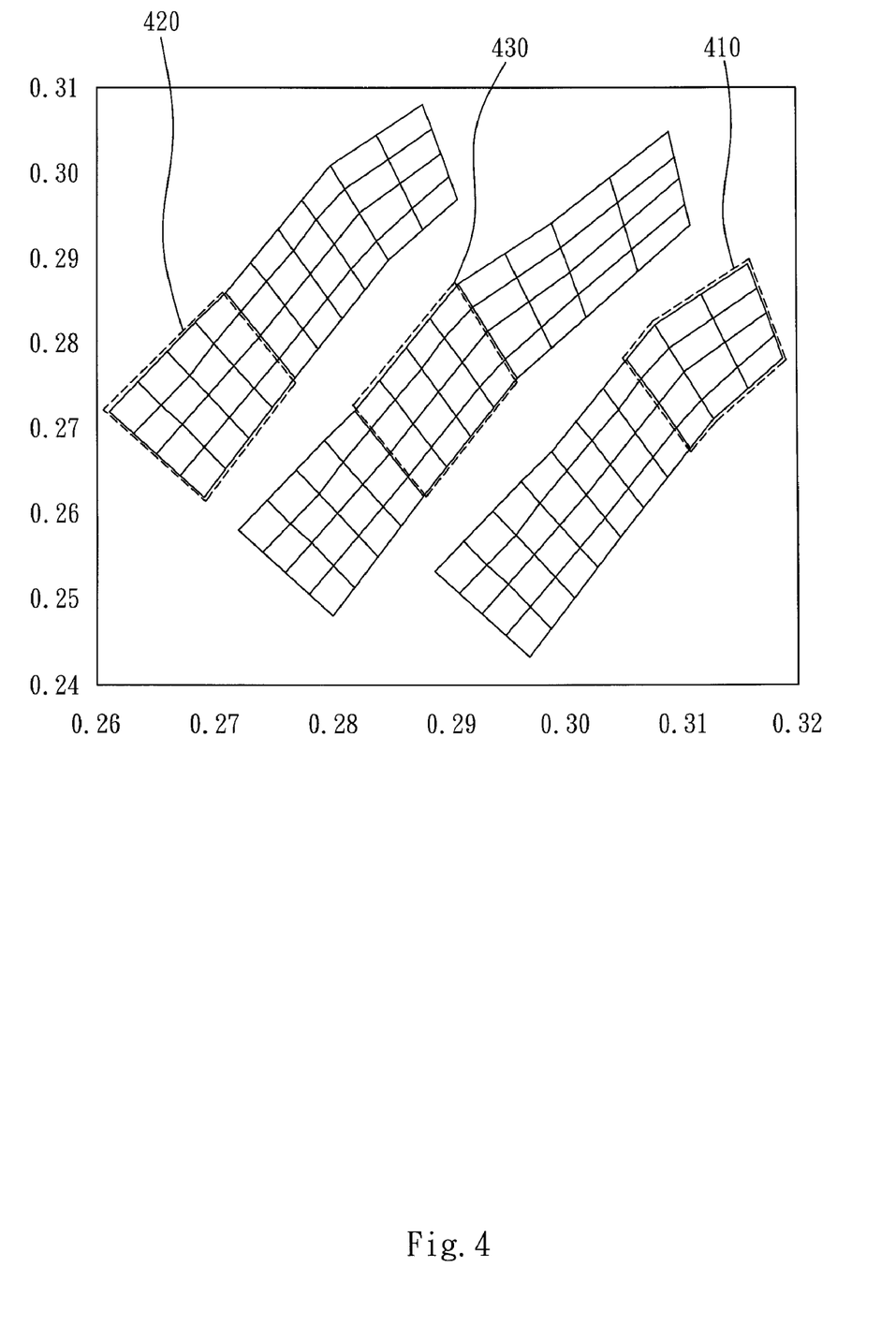
FIG. 4 illustrates the spectrum distribution in the CIE1931 color space of the first light source 310 and the second light source 320 in another embodiment of the present invention.

In the embodiment illustrated in FIG. 4, the first chromaticity light spectrum distribution 410, target spectrum distribution 430 and the second chromaticity light spectrum distribution 420 may belong to different stripe-shaped spectrum distributions. Each of the stripe-shaped spectrum distributions can be created by light sources from the same batch or having the same phosphor powder. Thus different stripe-shaped spectrum distributions can be created by light sources from different batches or made of different phosphor powder and have different ratios. As FIG. 4 shows, the stripe-shaped spectrum distribution where the target spectrum distribution 430 is situated lies in between the stripe-shaped spectrum distributions where the first chromaticities light spectrum distribution 410 and the second chromaticity light spectrum distribution 420 are situated. At this time, the first chromaticity light and the second chromaticity light can mix to generate light which has target spectrum distribution 430.

Figure 5:
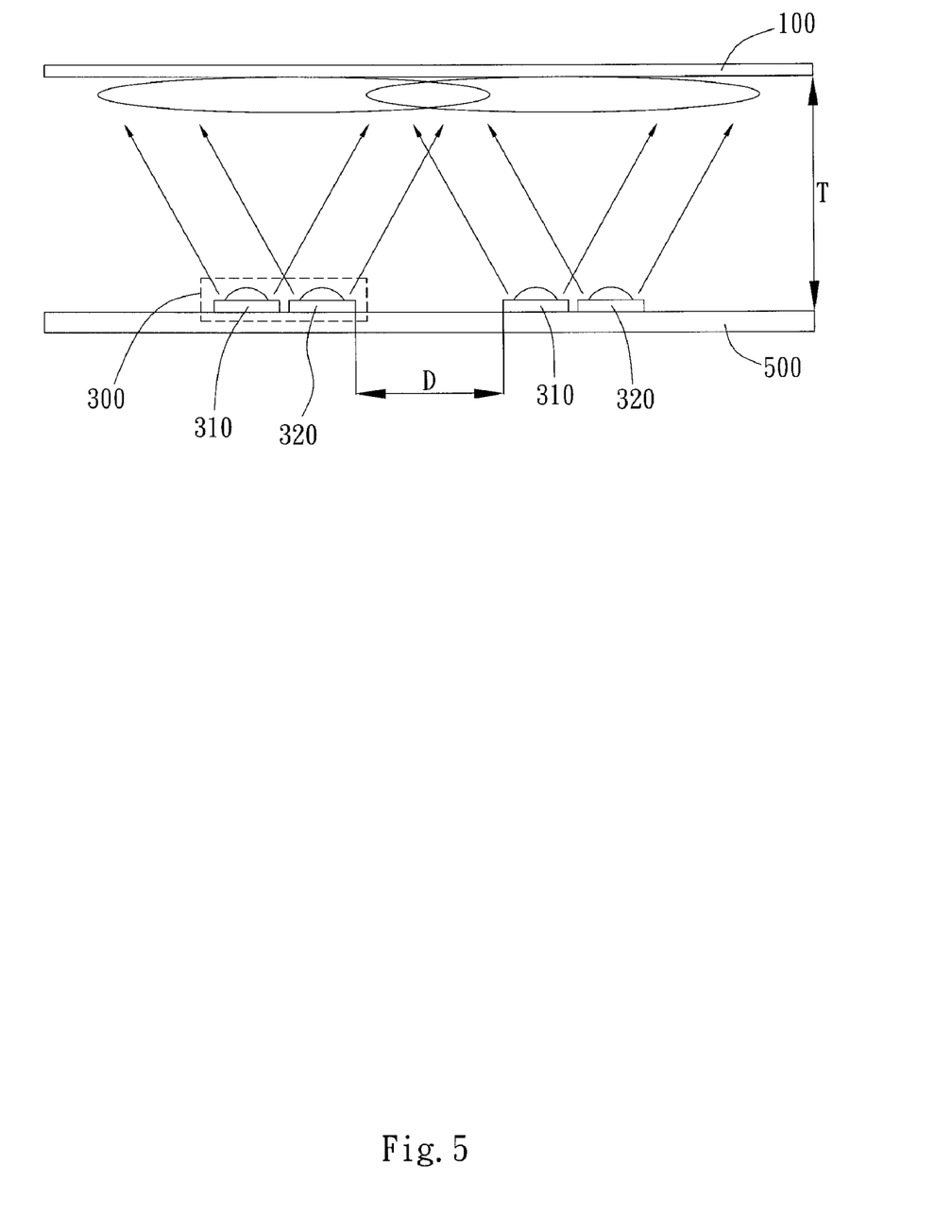
FIG. 5 illustrates a side view of one embodiment of the backlight module according to the present invention.

As FIG. 5 shows, the backlight module includes a base plate 500 which is parallel to the light incident plane 110 of the optical film set 100, wherein the light source sets 300 are disposed on the base plate 500. In the present embodiment, the first light source 310 and the second chromaticity light source 320 are disposed side by side and the distance between the two light sources is preferably equal to or greater than 4 mm. In order to obtain improved mixing of lights, in the present embodiment, the illuminated region on light incident plane 110 of the optical film set 100 by the first chromaticity light generated by the first light source 310 overlaps the illuminated region on light incident plane 110 of the optical film set 100 by the second chromaticity light generated by the second light source 320. As FIG. 5 shows, the illuminated region by the first light source 310 overlaps the illuminated regions by the second light source 320 from the same light source set 300 or by the second light source 320s from adjacent light source set 300. Thus amongst the lights which enters the light incident plane 110, each of the first chromaticity lights can mix with the second chromaticity lights. In more preferred embodiments, in order to improve the mixing of lights, when the distance D between adjacent light source sets 300 is greater than 15 mm, the ratio between distance T from the light source sets 300 to the light incident plane 110 of the optical film set 100 and the distance D between adjacent light source sets 300 is required to be greater than 0.4. The above-mentioned ratio is preferably limited to be substantially 1.5.

Figure 6A:
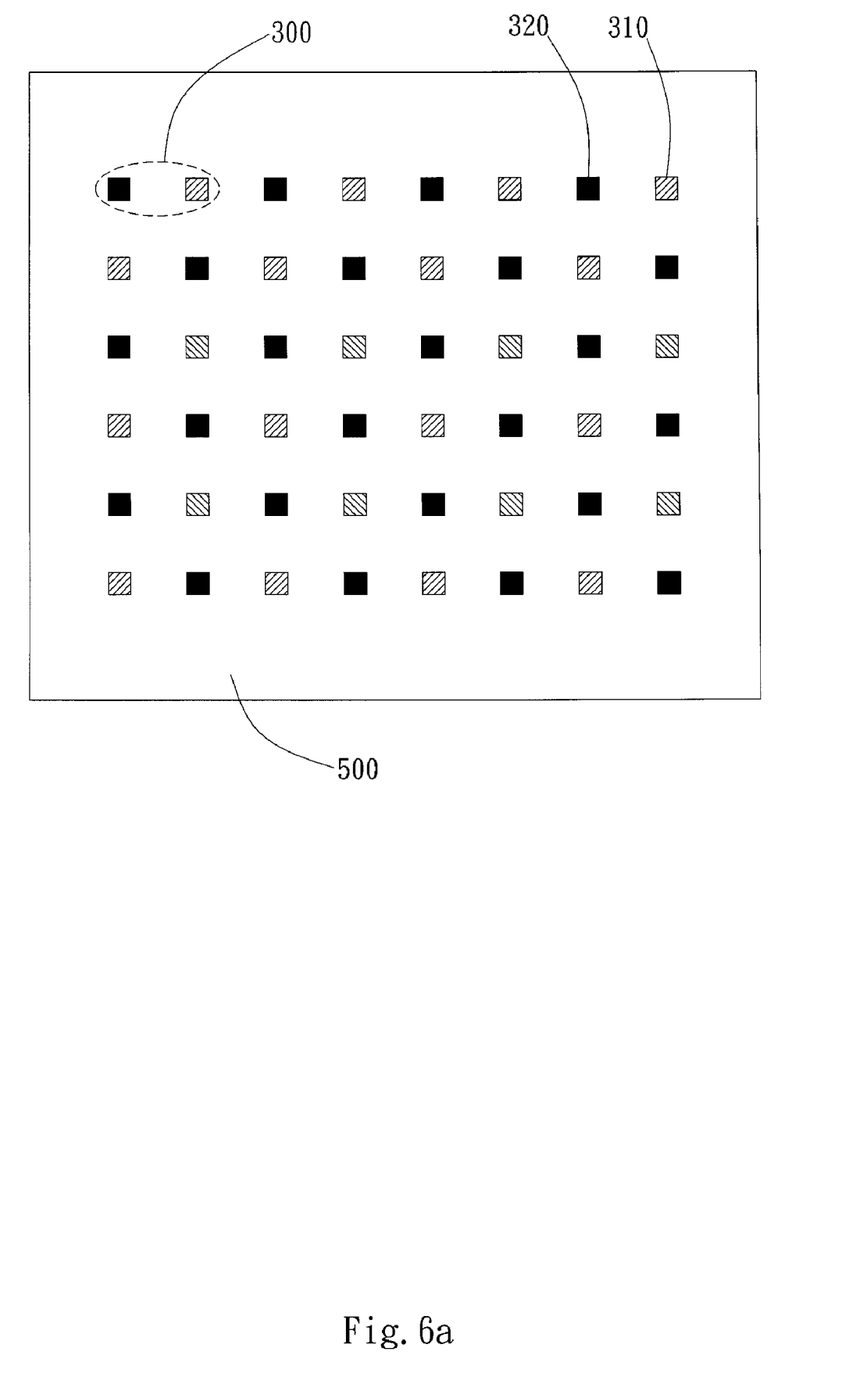
FIG. 6a illustrates the perspective view of the arrangement of the light source sets in one embodiment of the present invention.
Figure 6B:
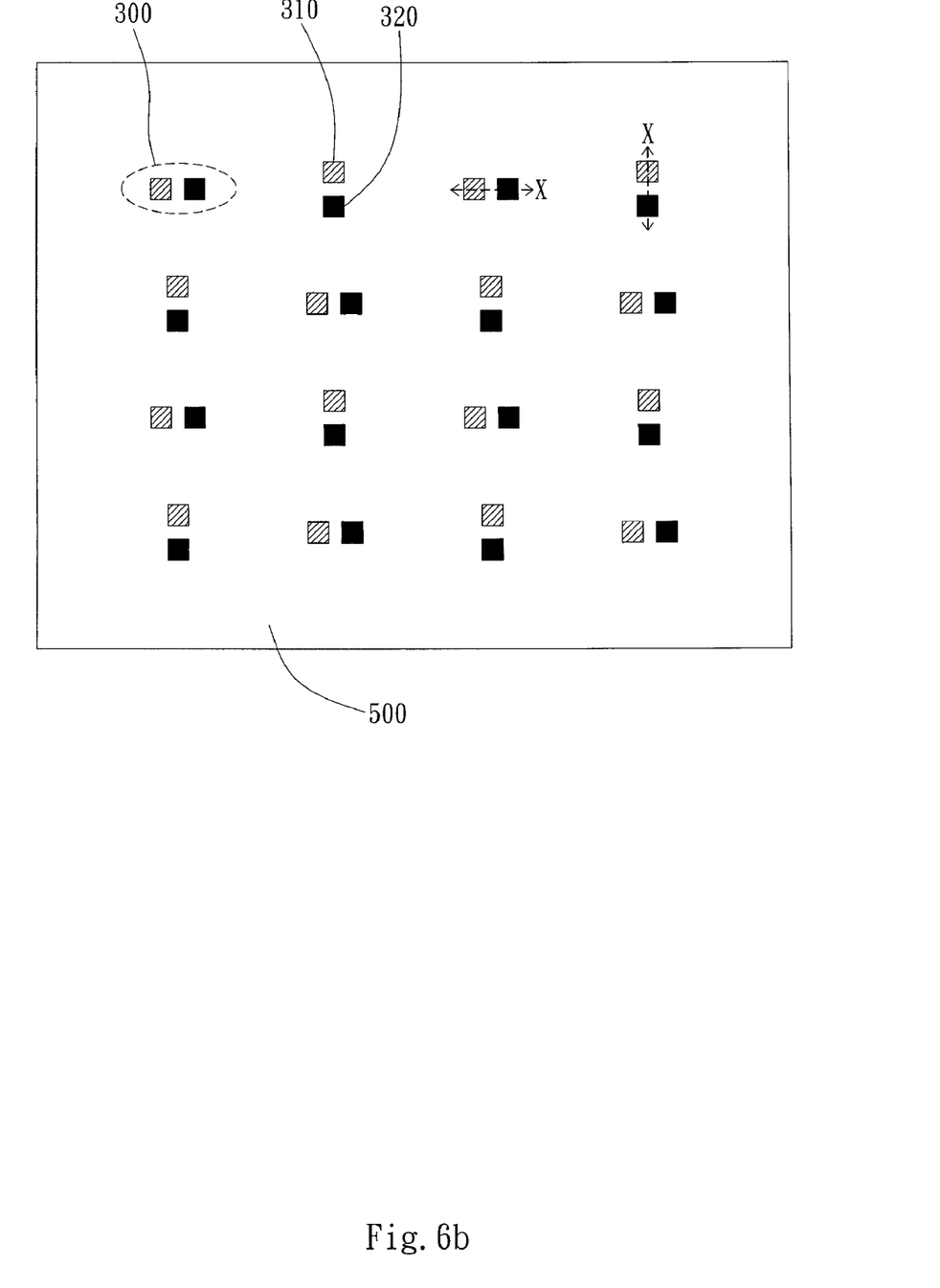
FIG. 6b illustrates the perspective view in the arrangement of the light source sets in another embodiment of the present invention.

As FIG. 6a shows, the light source sets 300 are distributed in the form of an array. However, in different embodiments, the above-mentioned array can be adjusted to have a cellular shape or other shapes. Furthermore, in the present embodiment, the first light source 310 and the second light source 320 of every light source set 300 are disposed collinearly and the distances between adjacent light sources are identical. However, in the embodiment illustrated in FIG. 6b, the first light source 310 and the second light source 320 of each light source set 300 are disposed in different patterns. As FIG. 6 shows, the first light source 310 has an aligning direction X relative (corresponding) to the second light source 320. In other words, the first light source 310 and the second light source 320 are aligned along the aligning direction X. The aligning direction X of each light source set 300 is rotated by an angle relative to the aligning direction X of adjacent light source sets 300. The above-mentioned angle is preferred to be 90□. Furthermore, the aligning directions X of adjacent light source sets 300 can be rotated in the same direction. However, in different embodiments, the aligning directions X can also be rotated irregularly.

Figure 7:
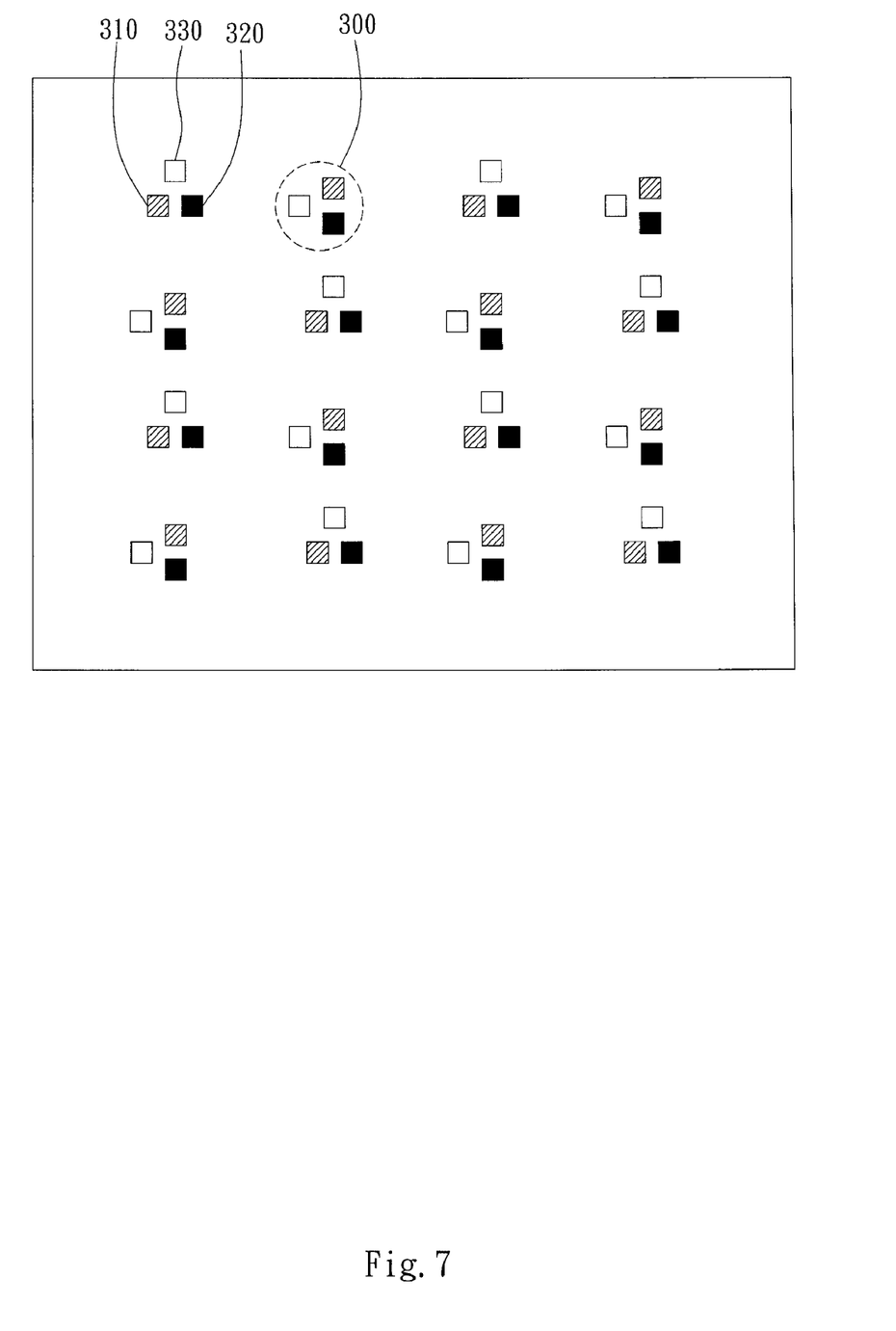
FIG. 7 illustrates the perspective view in the arrangement of the light source sets in yet another embodiment of the present invention.

In the embodiment in FIG. 7, other than the first light source 310 and the second light source 320, the light source set 300 further includes a target chromaticity light source 330. Light generated by the target chromaticity light source 330 is the target chromaticity light whose spectrum falls into the above-mentioned target spectrum distribution. Light of the target chromaticity light source 330, the first light source 310 and the second light source 320 mix and enter the optical film set 100 and the spectrum of the mixed light also falls into the target spectrum distribution. In the present embodiment, the target chromaticity light source 330, the first light source 310 and the second light source 320 are arranged in triangular patterns. The above-mentioned triangular patterns may include equilateral triangle pattern, isosceles triangle pattern or other triangle patterns. However, in different embodiments, the target chromaticity light source 330 can also be aligned with the first light source 310 and the second light source 320 or arranged in other patterns. Furthermore, as FIG. 7 shows, the triangular orientations of the target chromaticity light sources, first light sources 310 and the second light sources 320 in adjacent light source sets 300 differ by a rotation angle. This rotation angle is preferably 90 degree but can also include 30 degree, 60 degree or other angles.

Figure 8:
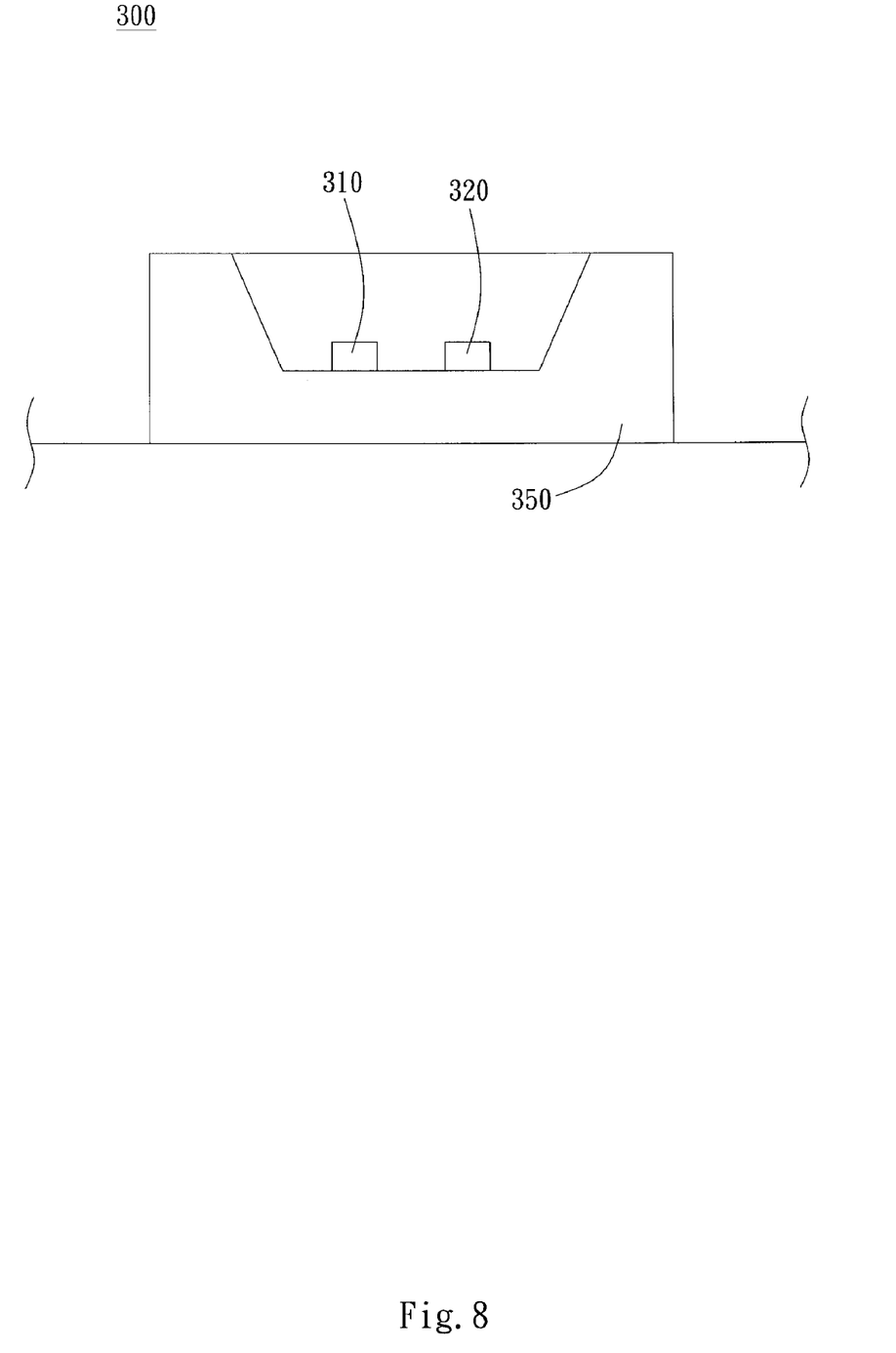
FIG. 8 illustrates a perspective view of the light source set in one embodiment using the package entity.

FIG. 8 illustrates another embodiment of light source sets 300. In the present embodiment, the light source set 300 further includes a package entity 350. The first light source 310 and the second light source 320 both include LED (Light Emitting Diode) chips and are packaged within the package entity 350. As FIG. 8 shows, the package entity 350 preferably includes a package cavity, wherein the LED chips forming the first light source 310 and the second light source 320 are accommodated in the package cavity. However, in different embodiments, the package entity 350 can also include a prism entity which accommodates the first light source 310 and the second light source 320 formed by LED chips.

Figure 9:
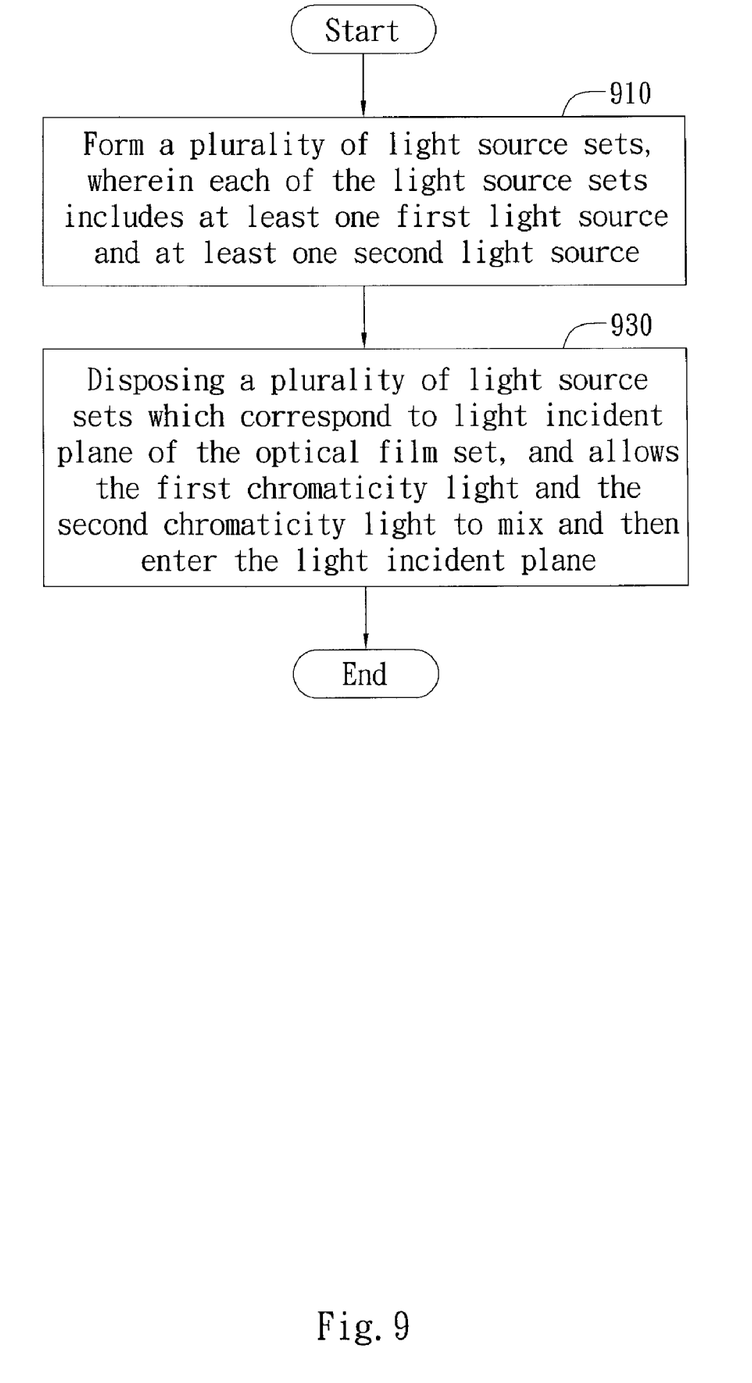
FIG. 9 and FIG. 10 illustrate the flow charts of the manufacture method of the backlight module according to the present invention.

As FIG. 9 shows, the manufacture method of the backlight module of the present invention includes step 910 of forming a plurality of light source sets. Each of the light source sets includes at least one first light source and at least one second light source. As previously stated, the first light source generates a first chromaticity light and the second light source generates the second light, wherein the spectrum of the first chromaticity light and the spectrum of the second chromaticity light belong to the first color region. In the first color region, the chromaticity of the first chromaticity light is close to the second color region and the chromaticity of the second chromaticity light is close to the third color region. In more preferred embodiments, the first color region is a white light region, the second color region a yellow light region and the third color region a blue light region. As for the CIE 1931 color region, the white light region formed by the first color region is preferably situated in an area enclosed by (0.25, 0.23), (0.32, 0.31), (0.23, 0.31) and (0.32, 0.21).

In more preferred embodiments, the step 910 further includes assigning a target spectrum distribution region in the first color region. The spectrum of the light formed by mixing the first chromaticity light with the second chromaticity light falls into the coverage of the target spectrum distribution region. As for the CIE 1931 color space, the target spectrum distribution region is preferred to be situated in the area enclosed by (0.225, 0.205), (0.315, 0.305), (0.225, 0.305) and (0.315, 0.205). However, in several other embodiments, the target spectrum distribution region can be limited to be situated in the area enclosed by (0.288, 0.263), (0.296, 0.276), (0.291, 0.288) and (0.283, 0.272) in order to obtain a more even chromaticity uniformity. Furthermore, the coordinate difference in the CIE 1931 color space between the target spectrum distribution region and the spectrum of the first chromaticity light as well as the coordinate difference in the CIE 1931 color space between the target spectrum distribution region and the spectrum of the second chromaticity light is between (0.036, 0.056) and (−0.036, −0.056). In more preferred embodiments, the above-mentioned coordinate difference can be reduced to between (0.018, 0.028) and (−0.018, −0.028), or can be furthered reduced to between (0.01, 0.014) and (−0.01, −0.014) in order to obtain a more even chromaticity uniformity. The above-mentioned coordinate difference preferably refers to a distance from the center of the target spectrum distribution region to the center of spectrum of the first chromaticity light or to the center of spectrum of the second chromaticity light.

As for the more preferred embodiments, the first light source and the second light source are disposed next to each other on the base plate of the backlight module to form the light source set. At this time, each light source set can be added with a target chromaticity light source which operates together with the first light source and the second light source. The spectrum of light generated by the target chromaticity light source falls into the target spectrum distribution region. Furthermore, in another embodiment, the light source set further includes a package entity while the first light source and the second light source both include LED chips. Thus the present step includes packaging the first light source and the second light source within the package entity.

Step 930 includes disposing a plurality of light source sets which correspond to the light incident plane of optical film set and thus the first chromaticity light and the second chromaticity light mix and enter the light incident plane. The optical film set includes one or a plurality of disklike/plank-shaped optical elements such as light guide plate, polarizer film, brightness enhancing film etc. As for the bottom-lighting backlight module, the light incident plane is also the bottom surface of optical film set. As for the edge-lighting backlight module, the light incident plane is the lateral surface of optical film set.

Figure 10:
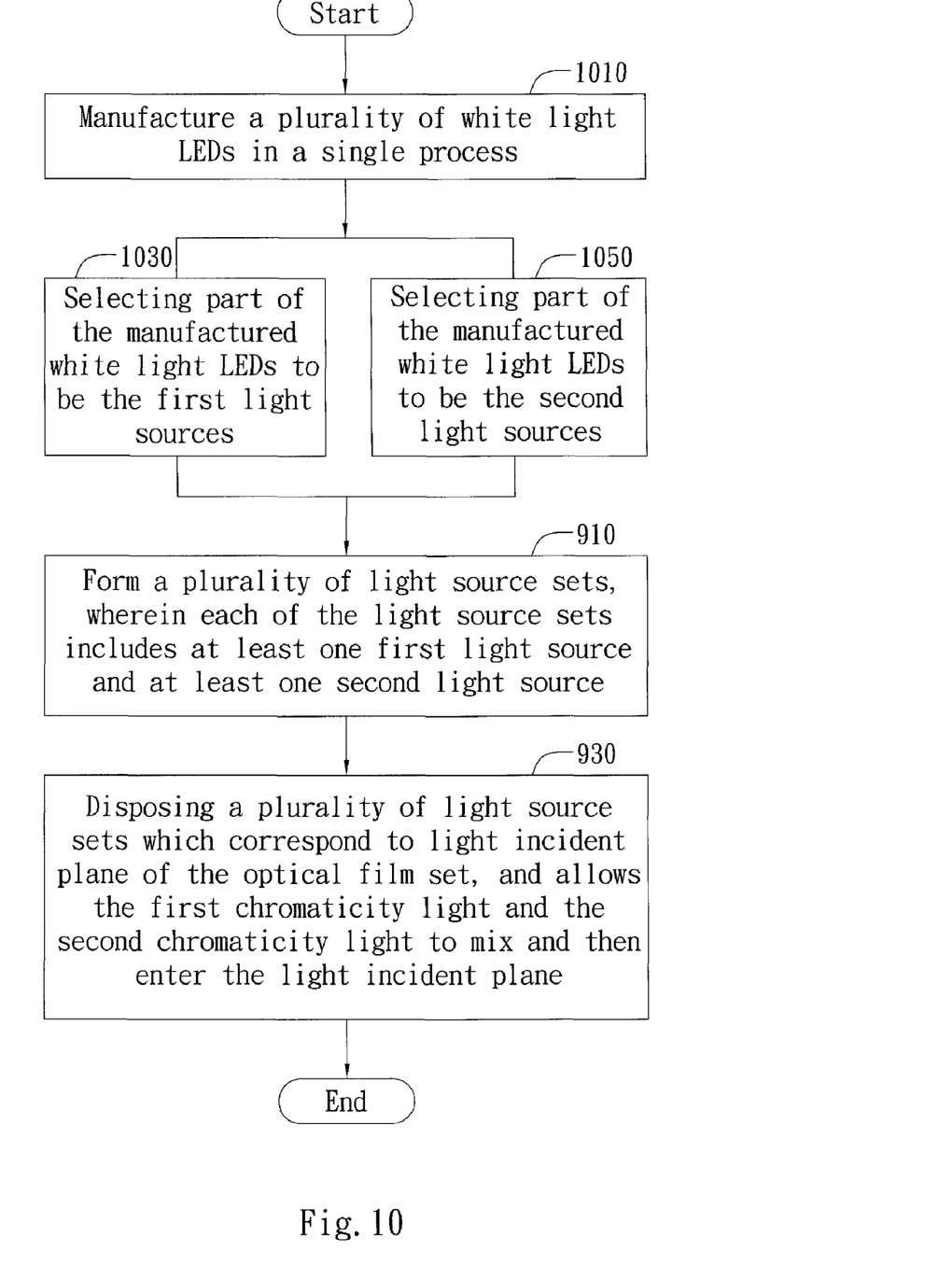

In the embodiment illustrated in FIG. 10, the manufacture method further includes step 1010, step 1030 and step 1050. The step 1010 includes manufacturing a plurality of white light LEDs in a single process. In other words, the white light LEDs are products manufactured in the same batch. In more preferred embodiments, the white light LEDs contain the phosphor powders with identical composition and ratio, but the density of phosphor powders may differ due to the tolerance of production precision.

Step 1030 includes selecting part of the above-mentioned manufactured white light LEDs to be the first light sources while step 1050 includes selecting part of the above-mentioned white light LEDs to be the second light sources. Due to the fact that the white light LEDs manufactured by the same process may contain phosphor powders of different density. Thus the chromaticity of light generated by white light LEDs forms a stripe-shaped distribution in CIE 1931 color space. In the present embodiment, the white light LED which generates light with chromaticity close to two ends of the stripe-shaped distribution in CIE 1931 color space will be selected as the first light source and the second light source. Light with chromaticity falling into the middle section of stripe-shaped distribution can be created by mixing lights generated by first light source 310 and second light source 320.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A backlight module comprising:
an optical film set having a light incident plane; and
a plurality of light source sets disposed correspondingly to the light incident plane of the optical film set, wherein each of the light source sets includes:
at least one first light source generating a first chromaticity light; and
at least one second light source generating a second chromaticity light, the first chromaticity light and the second chromaticity light being mixed and enter the light incident plane;
wherein a spectrum of the first chromaticity light and a spectrum of the second chromaticity light both belong to a first color region, the spectrum of the first chromaticity light is close to a second color region while the spectrum of the second chromaticity light is close to a third color region.

2. The backlight module of claim 1, wherein the first chromaticity light and the second chromaticity light are respectively a white light, the first color region is a white light region and is situated in an area enclosed by (0.23, 0.21), (0.32, 0.31), (0.32, 0.21), and (0.23, 0.31) in the CIE1931 color space.

3. The backlight module of claim 2, wherein the second color region is a yellow light region and the third color region is a blue light region.

4. The backlight module of claim 1, wherein the first light source and the second light source have an identical phosphor, a concentration of the phosphor of the first light source is different to a concentration of the phosphor of the second light source.

5. The backlight module of claim 1, wherein the first color region has a target spectrum distribution, the first chromaticity light and the second chromaticity light mix together and have a spectrum falling into the target spectrum distribution, a coordinate difference in the CIE1931 color space between the target spectrum distribution and the spectrum of the first chromaticity light as well as the spectrum of the second chromaticity light is between (0.036, 0.056) and (−0.036, −0.056).

6. The backlight module of claim 5, wherein the coordinate difference in the CIE1931 color space between the target spectrum distribution and the spectrum of the first chromaticity light as well as the spectrum of the second chromaticity light is between (0.018, 0.028) and (−0.018, −0.028).

7. The backlight module of claim 6, wherein the coordinate difference in the CIE1931 color space between the target spectrum distribution and the spectrum of the first chromaticity light as well as the spectrum of the second chromaticity light is between (0.01, 0.014) and (−0.01, −0.014).

8. The backlight module of claim 5, wherein the target spectrum distribution is situated in an area enclosed by (0.225, 0.205), (0.315, 0.305), (0.225, 0.305), and (0.315, 0.205) in the CIE1931 color space.

9. The backlight module of claim 8, wherein the target spectrum distribution is situated in an area enclosed by (0.288, 0.263), (0.296, 0.276), (0.291, 0.288), and (0.283, 0.272) in the CIE1931 color space.

10. The backlight module of claim 5, wherein the light source set 300 includes a target chromaticity light source generating a target chromaticity light, a spectrum of the target chromaticity light falls into the target spectrum distribution, the target chromaticity light, the first chromaticity light and the second chromaticity light mix together and enter the light incident plane 110 of the optical film set 100.

11. The backlight module of claim 1, wherein the light source set 300 further includes a package entity, the first light source 310 includes a first LED (Light Emitting Diode) chip and the second light source 320 includes a second LED chip, the first LED chip and the second LED chip are both packaged in the package entity.

12. The backlight module of claim 1 further comprising a base plate in parallel with the light incident plane of the optical film set, wherein the light source set 300s are disposed on the base plate.

13. The backlight module of claim 12, wherein when a spacing between the adjacent light source sets is greater than 15 mm, a ratio of distance between the light source set and the optical film set to the spacing between the adjacent light source sets is greater than 0.4.

14. The backlight module of claim 12, wherein the light source sets are disposed in a matrix on the base plate.

15. The backlight module of claim 12, wherein the first light source and the second light source of the light source set have an aligning direction, the aligning direction of each of the light source sets is rotated in an angle relative to the aligning direction of the adjacent light source set.

16. The backlight module of claim 12, wherein the light source set includes a target chromaticity light source generating a target chromaticity light, the target chromaticity light source, the first light source and the second light source are arranged in a triangle pattern, the target chromaticity light, the first chromaticity light and the second chromaticity light mix together and enter the light incident plane of the optical film set.

17. The backlight module of claim 1, wherein an illuminated region on the optical film set by the first chromaticity light generated by the first light source overlaps an illuminated region on the optical film set by the second chromaticity light generated by the second chromaticity light source of the light source set and by the second chromaticity light generated by the second chromaticity light source of the adjacent light source set.

18. A manufacture method of backlight modules comprising:

forming a plurality of light source sets, wherein each of the light source sets includes:
at least one first light source generating a first chromaticity light; and
at least one second light source generating a second chromaticity light, wherein a spectrum of the first chromaticity light and a spectrum of the second chromaticity light belong to a first color region, the spectrum of the first chromaticity light is close to a second color region while the spectrum of the second chromaticity light is close to a third color region;
disposing the plurality of light source sets corresponding to a light incident plane of the optical film set, thus the first chromaticity light and second chromaticity light mix together and enter the light incident plane 110 of the optical film set.

19. The manufacture method of claim 18 further comprising:
manufacturing a plurality of white LEDs in one process;
selecting part of the white LEDs to be the first light sources; and
selecting part of the white LEDs to be the second light sources.

20. The manufacture method of claim 18, wherein the light source set forming step further includes assigning the first color region to a white light region, the white light region is situated in an area enclosed by (0.23, 0.21), (0.32, 0.31), (0.23, 0.31), and (0.32, 0.21) in the CIE1931 color space.

21. The manufacture method of claim 18, wherein the light source set forming step further includes assigning a target spectrum distribution in the first color region, the first chromaticity light and the second chromaticity light mix together and have a spectrum falling into the target spectrum distribution, a coordinate difference in the CIE1931 color space between the target spectrum distribution and the spectrum of the first chromaticity light as well as the spectrum of the second chromaticity light is between (0.036, 0.056) and (−0.036, −0.056).

22. The manufacture method of claim 21, wherein the light source set forming step further includes setting the coordinate difference in the CIE1931 color space between the target spectrum distribution and the spectrum of the first chromaticity light as well as the spectrum of the second chromaticity light between (0.018, 0.028) and (−0.018, −0.028).

23. The manufacture method of claim 22, wherein the light source set forming step further includes setting the coordinate difference in the CIE1931 color space between the target spectrum distribution and the spectrum of the first chromaticity light as well as the spectrum of the second chromaticity light between (0.01, 0.014) and (−0.01, −0.014).

24. The manufacture method of claim 21, wherein the light source set forming step further includes assigning the target spectrum distribution to be an area of the CIE1931 color space enclosed by (0.225, 0.205), (0.315, 0.305), (0.225, 0.305) and (0.315, 0.205).

25. The manufacture method of claim 24, wherein the light source set forming step further includes assigning the target spectrum distribution to be an area of the CIE1931 color space enclosed by (0.288, 0.263), (0.288, 0.263), (0.288, 0.263) and (0.283, 0.272).

26. The manufacture method of claim 21, wherein the light source set forming step further includes disposing a target chromaticity light source to generate a target chromaticity light, the target chromaticity light falls into the target spectrum distribution.

27. The manufacture method of claim 18, wherein the light source set forming step further includes packaging the first light source and the second light source in a package entity.

* * * * *